US006399026B1

(12) United States Patent
Karrai

(10) Patent No.: US 6,399,026 B1
(45) Date of Patent: Jun. 4, 2002

(54) SAMPLE HOLDER APPARATUS

(75) Inventor: Khaled Karrai, Munich (DE)

(73) Assignee: Karrai-Haines GbR, Gesellshcaft bürgerlichen Rechts, Munich (DE)

(*) Notice: Subject to any disclaimer, the term of this patent is extended or adjusted under 35 U.S.C. 154(b) by 0 days.

(21) Appl. No.: 09/339,073

(22) Filed: Jun. 23, 1999

(30) Foreign Application Priority Data

Jun. 30, 1998 (GB) ........................................... 9814144

(51) Int. Cl.[7] ............................................ G01N 21/01

(52) U.S. Cl. ................. 422/104; 422/82.05; 422/82.07; 250/234; 250/239; 250/306; 250/307; 250/309; 250/346; 250/347; 436/164; 436/165; 356/244; 356/246; 359/819

(58) Field of Search ........................... 422/82.05, 82.07, 422/104; 73/105; 250/346–347, 234, 239, 306–307, 309; 436/164, 165; 62/51.1; 356/244, 246; 359/385, 387, 819

(56) References Cited

U.S. PATENT DOCUMENTS

| | | | | | |
|---|---|---|---|---|---|
| 4,686,366 | A | | 8/1987 | Stuke | |
| 4,729,773 | A | | 3/1988 | Shirato et al. | |
| 4,954,713 | A | * | 9/1990 | Le Bris et al. | 250/458.1 |
| 5,035,333 | A | | 7/1991 | Klingner | |
| 5,308,975 | A | * | 5/1994 | Grebe | 250/239 |
| 5,336,324 | A | | 8/1994 | Stall et al. | |
| 5,473,157 | A | * | 12/1995 | Grober et al. | 250/234 |
| 5,542,256 | A | * | 8/1996 | Batey et al. | 62/610 |
| 5,682,447 | A | * | 10/1997 | Kuzyk et al. | 385/13 |
| 5,750,989 | A | * | 5/1998 | Lindsay et al. | 250/306 |
| 5,828,502 | A | * | 10/1998 | Afshari | 359/819 |

FOREIGN PATENT DOCUMENTS

| | | |
|---|---|---|
| JP | 62264603 | 11/1987 |
| JP | 06185844 | 7/1994 |

* cited by examiner

*Primary Examiner*—Jill Warden
*Assistant Examiner*—Kathryn Bex
(74) *Attorney, Agent, or Firm*—Watts Hoffmann Fisher & Heinke

(57) ABSTRACT

A sample holder apparatus for a top-loading cryostat insert based on a cage assembly system which is mounted onto a vacuum flange. The vacuum flange has a group of blind bores on the vacuum side of the flange, in which are mounted hollow cage assembly rods, and a further corresponding group of four blind bores on the air side of the flange for receiving further cage assembly rods. A cage assembly system can thus be provided on the vacuum side of the flange and, if desired, extended through the vacuum flange onto the air side with optical communication between the vacuum and air sides taking place through a window at the top of the flange. Feed-throughs on the flange provide for access of optical fibers and electrical leads. The design provides a sample holder which is readily adaptable and reconfigurable to perform a variety of optical experiments in a top-loading cryostat. Examples of near-field scanning microscopy (NSOM) and confocal microscopy are described.

6 Claims, 4 Drawing Sheets

SAMPLE HOLDER APPARATUS

FIELD OF THE INVENTION

The invention relates to a sample holder for a cryostat insert, more especially but not exclusively to a sample holder for a top-loading cryostat insert.

BACKGROUND ART

Conventionally sample holders for cryostat inserts are constructed by brazing and/or welding tubes, plates and disc-shaped heat shields onto a vacuum flange. One type of cryostat in widespread use is the top-loading type in which the sample holder fits into a cryostat insert tube having a flange at one end for mating with a corresponding flange of the sample holder and being closed at the other end. When the insert tube and sample holder are fitted together to form the insert, the space inside the insert can be evacuated and the insert loaded into the top side of a top-loading cryostat. Cryostats of this kind are designed to receive an insert of a fixed diameter, for example one-and-a-half inches, two inches and 50 mm. For magnet cryostats the diameter is usually dictated by the superconducting magnet coil dimensions, i.e. the inner coil diameter for a conventional vertical bore magnet coil alignment.

Top-loading cryostats with inserts of this kind are generally not considered to be ideally suited to perform experimentally demanding optical measurements. However, it is common to perform experimentally simple optical measurements, such as photoluminescence, in top-loading cryostats with the aid of optical fibers. The optical signals are conveyed to and from the sample via an optical fiber which extends into the insert via a vacuum-tight feed-through on the sample holder flange and to the close proximity of the sample, which is mounted near the base of the sample holder. For optical measurements of greater experimental complexity, optical fiber based excitation and signal collection is often not convenient in which case cryostats with side windows are generally favored so that free-space optics may be used. In the case of magnet cryostats, a split-coil magnet alignment is required if side window access is desired. Split-coil magnet cryostats are several times costlier than equivalent vertical-coil magnet cryostats. In a vertical-coil magnet cryostat a single base window is often provided for limited external optical access.

SUMMARY OF THE INVENTION

According to the invention there is provided a sample holder apparatus based on a conventional cage assembly optical rail system which extends at least on the vacuum-side of a sample holder vacuum flange. The cage assembly system preferably extends also on the air-side of the vacuum flange to form a contiguous cage assembly system extending on both sides of the vacuum flange which is provided with a window for optical communication through the vacuum flange. A cage assembly based sample holder complete with free-space optical components can be sleeved into a cryostat insert tube thus to allow a wide range of optical measurements to be performed at low temperature.

In the preferred embodiment, the sample holder flange is based on a standard vacuum flange into which has been bored on the vacuum side a group of four blind bores conforming to the square grid of a conventional cage assembly system and for receiving cage assembly rods. Rod holders may be implemented in many different ways other than blind bores, for example as sleeves extending from the main body of the vacuum flange. Preferably, a corresponding group of blind bores, conforming to the same square grid, is provided on the air-side of the flange for receiving further cage assembly rods, the bores on the air-side and vacuum-side of the flange being arranged in co-axial pairs with one of each pair on either side of the flange.

In the preferred embodiment, the rods used on the vacuum side are thin-walled stainless steel tubes, rather than the solid rods of conventional cage assembly system, thus providing a much lower thermal mass than solid rods. The interior of the tubes can also provide shielded routing channels for electrical leads or optical fibers which may pass into the tube interior via side holes in the tube wall. Conventional square cage plates are machined down at their corners to fit within an insert tube of inner diameter 49.6 mm so as to conform to an arcuate profile of a single circle, the center of which lies on or close to the main optical axis of the cage assembly system.

By basing the sample holder on a cage assembly system, a sample holder having the flexibility of a cage assembly system can be provided. Optical components such as lenses, irises, filters and polarizers can be moved, added and removed at will. Double cage plates can be incorporated to allow the cage assembly to be split up into detachable modules. For example, the lowest module, which may be a sample mounting module, can be detached and later reattached and realigned. A module, such as an optics module, may then be positioned above the sample mounting module. The optics module may be exchanged for another optics module for performing a different kind of optical measurement. If the cage assembly system is extended out onto the air-side of the flange, a camera such as a CCD camera can be mounted on a cage plate so as to view into the insert tube through the window provided in the vacuum flange. Other optical detector devices could also be mounted on the air-side, e.g. photomultipliers, CCD array detectors, multichannel plates and so forth.

Cage assembly systems are well known for bench-top optical arrangements.

One commercially available system is from the U.S. company, Thor Labs, Inc., New Jersey. This system is based on a square grid of four parallel rods of diameter 6 mm, the rod axes lying on a square of 30 mm side length. Along the rods are mounted cage plates having a corresponding square grid of four bores through which the rods can pass. The bores are arranged in respective corner regions of the plates which have outer dimensions of 40.6 mm square. The plates may have threaded holes of a standard diameter of 1.035 inches, i.e. approximately 25 mm, and standard threads such as RMS mount threads and C-mount optics threads. Optical components can then be mounted in these threaded holes.

Another commercially available cage assembly system, which is somewhat smaller, is from the German company Spindler & Hoyer and has the trade name "Mikrobank"and is based on a square grid of 16 mm side length. The exterior side lengths of the cage plates are 25 mm and the threaded through holes are 16 mm in diameter for receiving 15 mm diameter optical components. The diameter of the rods is 4 mm.

A third commercially available cage assembly system is from the U.S. company, AF Optical Company of Irvine, Calif. and has the trade name "MICROPTIC". This system is based on annular cage plates which are 10 mm thick and have an outer diameter of 49.25 mm and an inner diameter of either 25 mm or 30 mm. Each cage plate is provided with four holes based on a square grid dimensioned to receive rods of 6 mm diameter.

Cage assembly systems based on polygonal grids other than square ones could also be used, for example triangular, rectangular, pentagonal or hexagonal grids. Moreover, the number of rods provided need not be equal to the side number of the polygon. For example, with the square grid three rods can be used instead of four. This provides open access to one side of the cage assembly so that optical components can be inserted into and removed from a cage plate laterally with ease. For example, a polarizer may be inserted into a cage plate and then removed when no longer required. The cage plate can be left for possible future use. In addition a system using three rods is perfectly defined, being neither overdefined, i.e. hyperstatic, nor underdefined, i.e. hypostatic.

Further aspects of the invention are exemplified by the attached claims.

BRIEF DESCRIPTION OF THE DRAWINGS

For a better understanding of the invention and to show how the same may be carried into effect the invention is described in the following by way of example with reference to the drawings in which.

DETAILED DESCRIPTION

Figure 1:
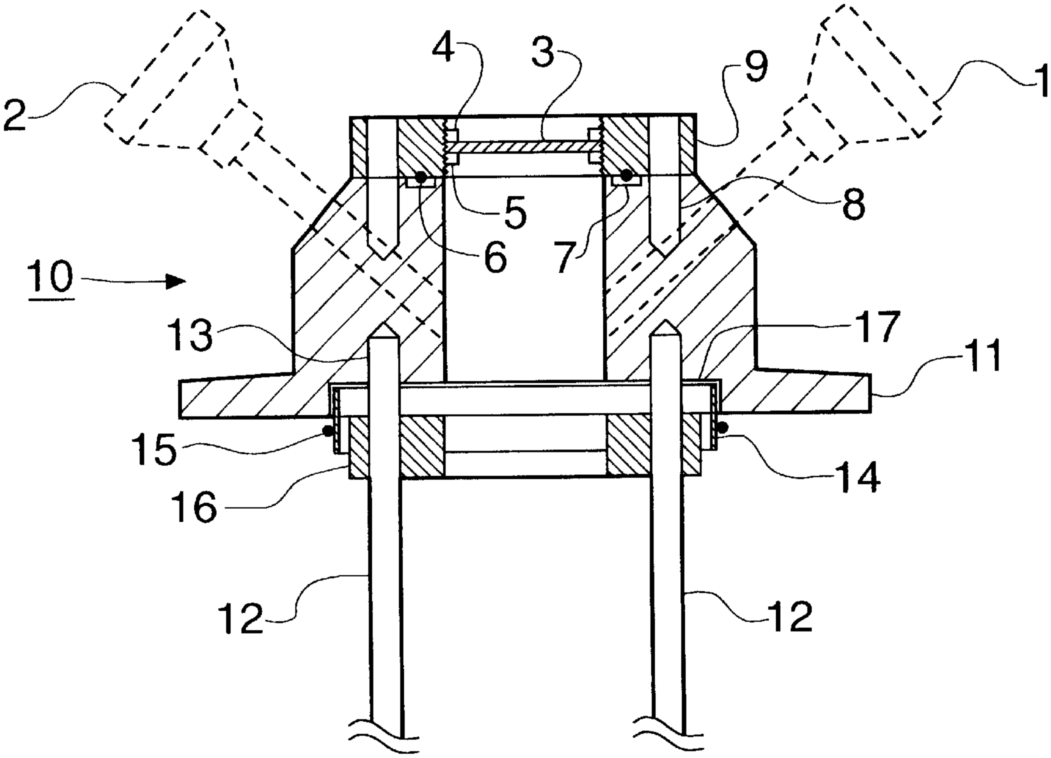
FIG. 1 is a sectional side view of a vacuum flange part of a sample holder according to a first embodiment of the invention.

FIG. 1 shows in sectional side view a vacuum flange 10 of a sample holder apparatus according to a first embodiment of the invention. The vacuum flange 10 has a group of four rod holders, in the form of blind bores 13, on the vacuum side of the flange 10, the bores being arranged to define a square grid. The vacuum flange 10 has a further group of four rod holders, also in the form of blind bores 8, on the air side of the flange arranged to define a further square grid, the respective squares having a common center point in plan view, defining the principal optical axis of the sample holder.

The blind bores 8 and 13 of the two groups of blind bores are arranged in pairs with one of each pair on either side of the flange. The blind bores of each pair of blind bores are aligned to hold respective rods coaxially on either side of the flange 10.

A group of three or four rods 12 are seated in respective ones of the blind bores 13 to extend parallel to each other away from the flange 10 conforming to the square grid and forming the cage of the cage assembly optical rail system.

An optical component mounting plate 16, a so-called cage plate, also known as a slide plate, is screwed to the underside of the vacuum flange 10 (screws not shown). Further cage plates can be provided as desired and can be mounted guided on the rods 12.

The lower part of the flange 10 has a flared portion 11 for fitting together with an insert tube to form a vacuum-tight seal via an O-ring 15 supported by an aluminum ring 14, the ring being received in a recessed portion 17 in the underside of the flange 10.

In the upper side of the vacuum flange 10 there is a cage plate 9 screwed onto the vacuum flange 10 (screws not shown) to form a vacuum tight seal via a ring shaped channel 7 and an O-ring 6 located by the channel 7. The cage plate 9 has a central threaded through hole in which is placed a window 3 held by a pair of threaded rings 4 and 5, a vacuum-tight seal being formed by cementing around the rings 4 and 5 with adhesive bonding material such as epoxy resin.

The vacuum flange is provided with a vacuum-tight feed-through 1 for electrical leads and a further vacuum-tight feed-through 2 for optical fibers, these feed-throughs being shown schematically with dashed lines in FIG. 1.

Figure 2:
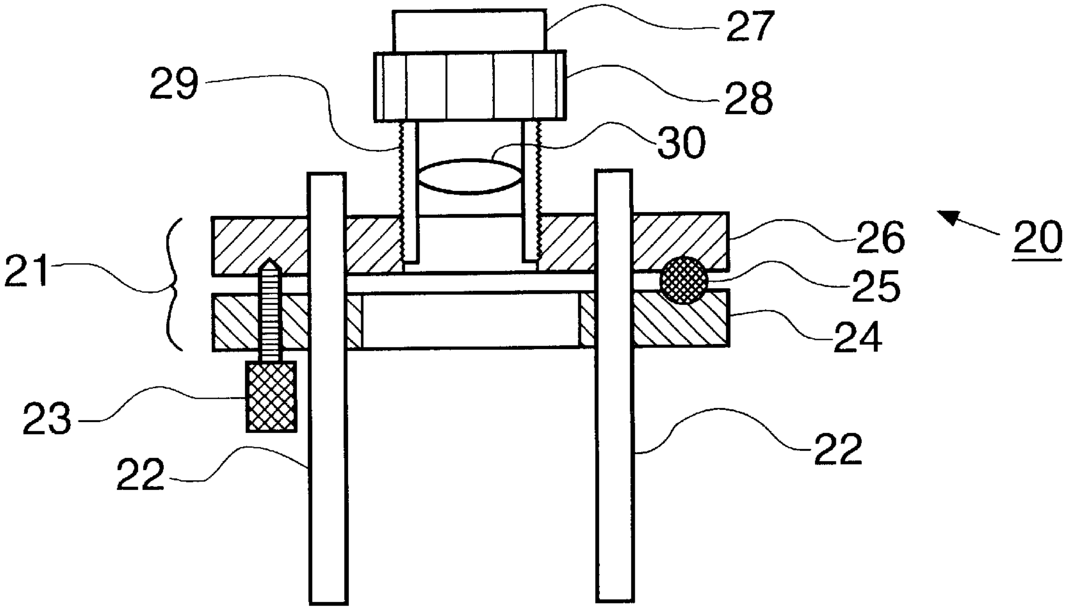
FIG. 2 is a sectional side view of a part of the sample holder of the first embodiment arranged on the air side of the vacuum flange part of FIG. 1.

FIG. 2 shows an air-side module 20 of the cage assembly system which has three or four rods 22 which fit into the blind bores 8 of the flange 10 shown in FIG. 1. The rods 22 extend parallel to each other away from the flange and parallel to the rods 12 on the vacuum side of the flange to form a contiguous cage assembly system extending through the vacuum flange 10. The rods are thus arranged in coaxial pairs. This is a convenient arrangement, but any other arrangement providing for a contiguous optical axis would suffice. For example, the square rod grid on one side of the flange could be rotated by any angle relative to the square rod grid on the other side of the flange, e.g. by 45°.

The air-side module 20 is based around a CCD camera 27 mounted on a zoom holder 28 and lens tube 29 containing a lens 30 for focusing light onto the CCD camera chip. The lens tube 29 is threaded to a tiltable cage plate 26 of a tilt stage 21 comprising a further cage plate 24 which is secured to the rods 22. Tilting is effected by a standard thumb screw 23 and hinge 25 arrangement. The camera 27 can thus be used to view along the optical axis through the window 3 and into the vacuum side of the flange. The zoom holder 28, lens tube 29 and tilt stage 21 are all standard commercially available cage assembly system components.

Figure 3:
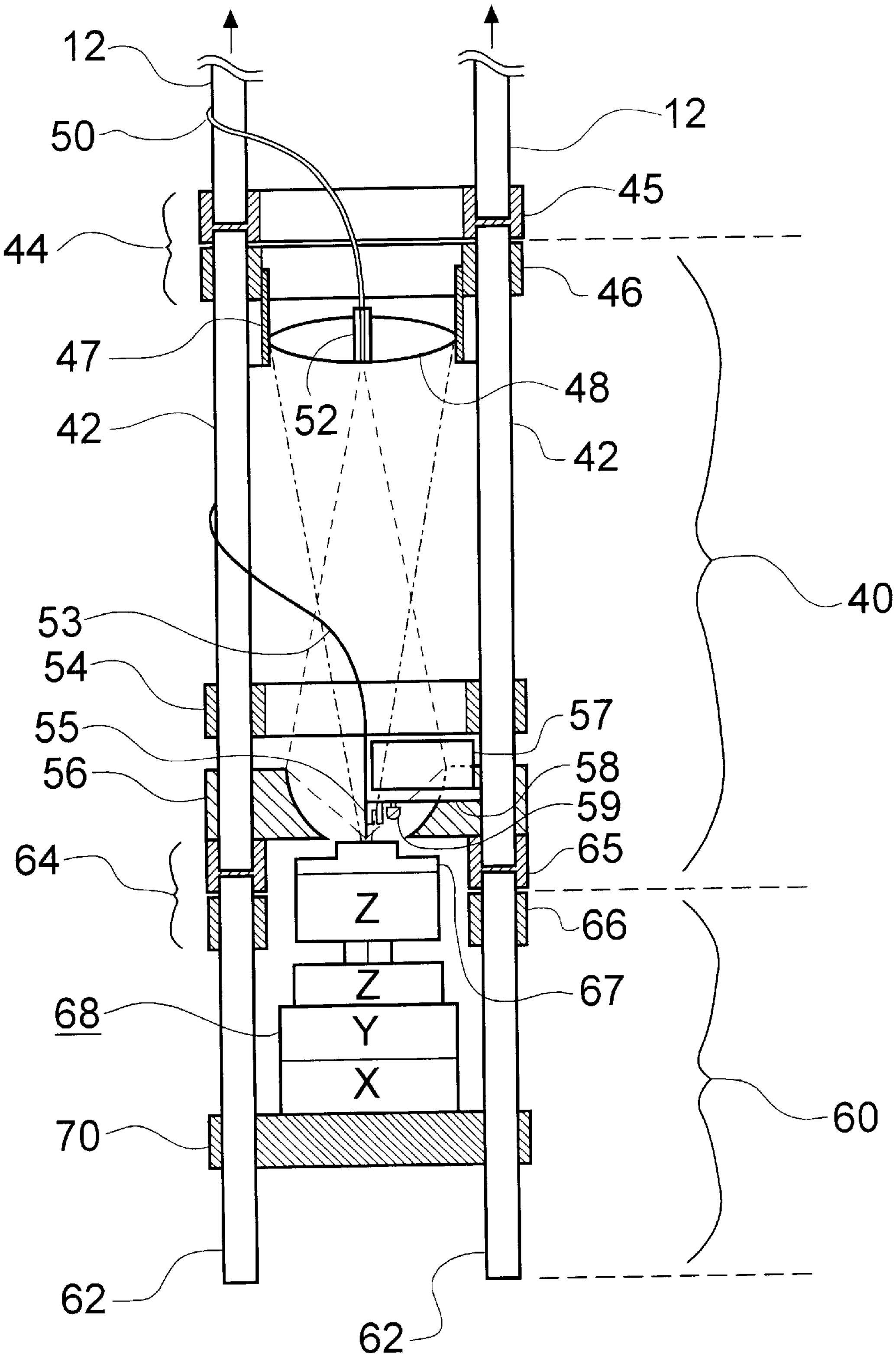
FIG. 3 is a sectional side view of a part of the sample holder of the first embodiment arranged on the vacuum side of the vacuum flange of FIG. 1, including an optics module and a sample mounting module.

FIG. 3 shows a lower part of the sample holder of FIGS. 1 and 2 comprising two detachable cage assembly modules 40 and 60, based on sets of rods 42 and 62 respectively. The upper detachable cage assembly module 40 is more specifically referred to as the optics module 40. The module 40 is attached at the ends of the rods 12 which extend from the vacuum flange 10 as described further above with reference to FIG. 1. The module 60 is attached to the lower end of the module 40.

The module 40 houses optical components of a near-field scanning optical microscope (NSOM) and is referred to in the following as the optics module. The module 60 houses a sample holder 67 mounted on an xyz positioning device 68 which is in turn mounted on a base plate 70 which is a further cage plate of the cage assembly system.

The optical components of the optics module 40 perform the functions of sample excitation, signal collection and external viewing of the sample and sample area by the camera 27 described above with reference to FIG. 2. Sample excitation is performed via the single mode optical fiber 53 which terminates in a near-field aperture facing the sample holder 67. The single mode optical fiber 53 has attached to it one leg of a quartz tuning fork 55 which is bonded by its base onto a printed circuit board (PCB) 58 which comprises signal preprocessing circuitry for preprocessing the AC signal received from the electrodes of the tuning fork 55. The circuit board also has mounted thereon a light emitting diode (LED) 59 for illuminating a sample mounted on the sample holder 67 to allow viewing by the camera 27. The LED 59 is mounted in the shadow of the PCB 58 to avoid saturating the camera 27. The PCB 58 is attached to a mounting body 57 which is in turn attached to a cage plate 54. A further cage plate is positioned below the cage plate 54 and comprises an ellipsoid mirror 56 for signal collection from around its lower focal point which is in the region of the tip of the single mode optical fiber 53. A lens mount 47 in which is mounted an achromat lens 48 is positioned level with the upper focal point of the ellipsoid mirror 56. The lens 48 has a hole through its optical axis in which is fitted a multimode fiber 50 inside an axially slidable ferrule 52. The aperture of the fiber 50 is positioned at the upper focal point of the ellipsoid mirror 56 to collect sample signal from the sample area as shown by the dashed lines in FIG. 3. The lens 48 is selected approximately to collimate light from the sample area as shown by the dot-dashed lines so as to pass light from the sample area onto the lens 30 of the air-side unit 20. The lens mount 47 is fitted into the cage assembly system via a further cage plate 46 which together with another cage plate 45 forms a double cage plate 44 bridging the rods 12 attached to the vacuum flange 10 and the rods 42 of the module 40. The module 40 can be detached from the vacuum flange 10 by releasing the double cage plate 44. At the lower end of the module 40 a further double cage plate 64 bridges the rods 42 of the module 40 and the rods 62 of the further module 60. The further double cage plate 64 comprises a cage plate 65 attached to the rods 42 and a cage plate 66 attached to the rods 62.

The double cage plate arrangements 44 and 64 thus serve as rod group linkage mechanisms by which the respective optical axes of adjacent rod groups can be realigned, and which also provide for convenient detachment of adjacent rod group assemblies.

The above description of the optical and mechanical components of the modules 40 and 60 is given merely by way of example of the kind of cage assembly based system which may be constructed in the format of a sample holder for a tubular cryostat insert. Many other kinds of optical system which can be realized within the cage assembly format will be readily contemplated.

Figure 6:
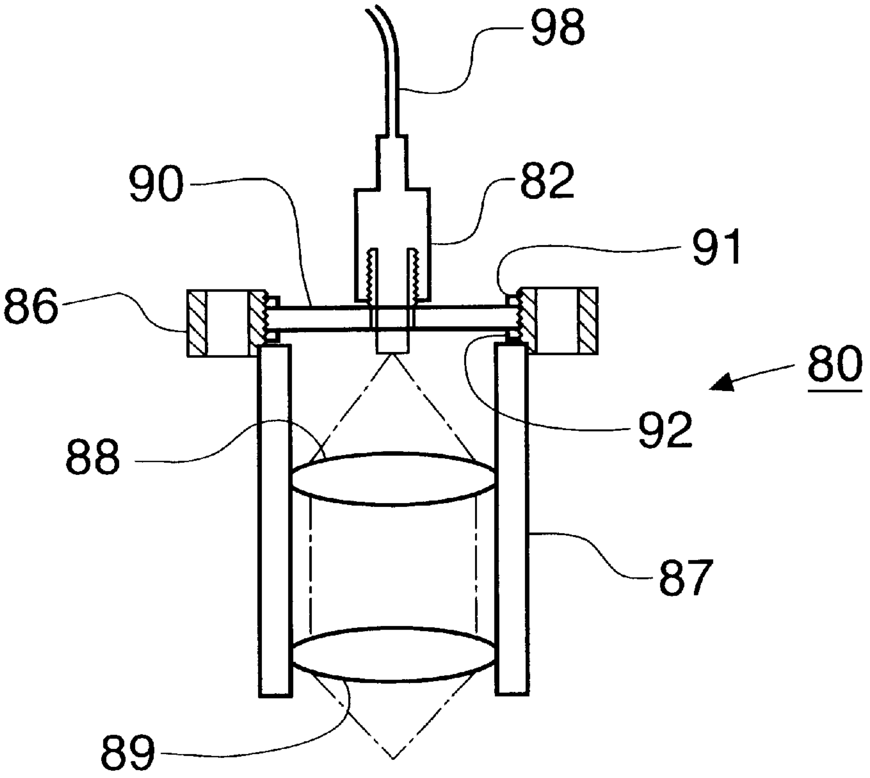
FIG. 6 is a sectional side view of an optics module of a second embodiment of the invention.

One variation is now described with reference to FIG. 6. FIG. 6 shows a further optics module 80 for performing confocal microscopy which can replace the NSOM optics module 40 of FIG. 3. The confocal optics module 80 comprises a set of rods (not shown), a cage plate 86 with an FC adapter 90 secured by clamping rings 91 & 92, and an FC coupler 82 with an associated optical fiber 98. A lens tube 87 is attached to the cage plate 86 and houses an objective lens 89 and a focusing lens 88.

To change the cage assembly system from that shown in FIGS. 1 to 3, which is for near-field scanning microscopy, the sample mounting module 60 is detached, followed by the NSOM optics module 40. The confocal optics module 80 is then attached to the flange rods 12 via the double cage plate 44 and the sample mounting module 60 reattached. In a few steps, the sample holder can thus be reconfigured to perform a different kind of microscopy.

Further variations include exchanging the objective lens 89 for a solid immersion lens to perform solid immersion microscopy and exchanging the objective lens 89 for a standard microscope objective mounted in the lens tube via an RMS adapter to perform conventional microscopy. Generally, the freedom provided by the cage assembly system format will allow all manner of optical systems to be incorporated into the sample holder which may not include any of the optical or mechanical components described in the examples shown in FIGS. 3 and 6.

In general, any two modules of the modular cage assembly are releasably interconnected by respective rod group linkage mechanisms in the form of double cage plates 44, 64 which are adjustable between a locked condition in which the respective adjacent groups of rods, e.g. 12 & 42 and 42 & 62 in the case of FIG. 3, are fixed in position relative to each other and an unlocked condition in which the respective adjacent groups of rods are displaceable relative to each other in a plane perpendicular to the optical axis around a position of axial alignment of the respective adjacent groups of rods. The double cage plates comprise first and second slidable cage plates 45 & 46, and 65 & 66, secured to end sections of the adjacent groups of rods respectively, the slidable cage plates being adjustable between a locked condition in which the slidable cage plates are fixed in position relative to each other and an unlocked condition in which the slidable cage plates are slidable relative to each other in the plane of the slide plates thereby to adjust the relative coaxial alignment between the adjacent groups of rods.

Figure 4:
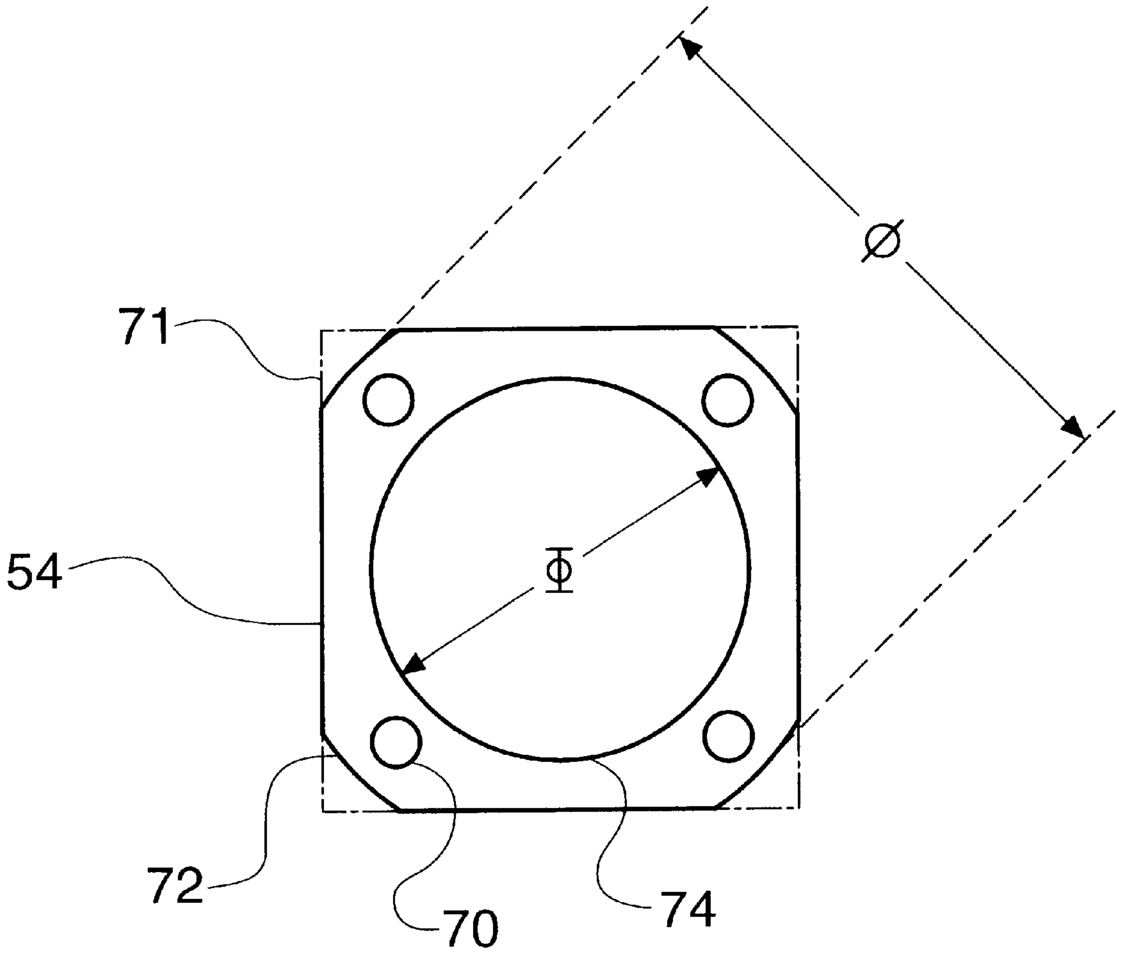
FIG. 4 is a plan view of a cage plate of the first embodiment.

FIG. 4 shows in plan view the cage plate 54. The cage plates 45, 46, 65 and 66 on the vacuum side of the flange 10 are similar. The cage plate has four bores 70 through which the rods may pass. A threaded through hole 74 of internal diameter $\Phi$ passes through the center of the cage plate and can be used for mounting components using threaded rings. The cage plate 54 is based on a standard commercially available cage plate which has had its four corners 71 (shown with dot-dashed lines) machined off to form four arcuate edge portions 72 lying on the arc of a single circle of diameter $\phi$ the center of which will lie on or near to the optical axis in the assembled system. The double cage plates referred to above are also standard commercially available items with the exception that the two cage plates have machined corners as described immediately above. When fitted into an insert tube, the arcuate portions 72 of the cage plates are in close proximity to the inner surface of the insert tube, but four gaps are formed between the inner surface of the insert tube and the straight portions of the outer periphery of the cage plates extending between the arcuate portions. These gaps can be used to provide space for feeding through electrical leads and optical fibers on the outside of the sample holder. In an alternative design, the outer periphery of the cage plates could be circular, or have one arcuate portion extending through the major part of a circle, i.e. through more than 180 degrees, and one chordal straight portion interconnecting the ends of the single arcuate portion.

Figure 5:
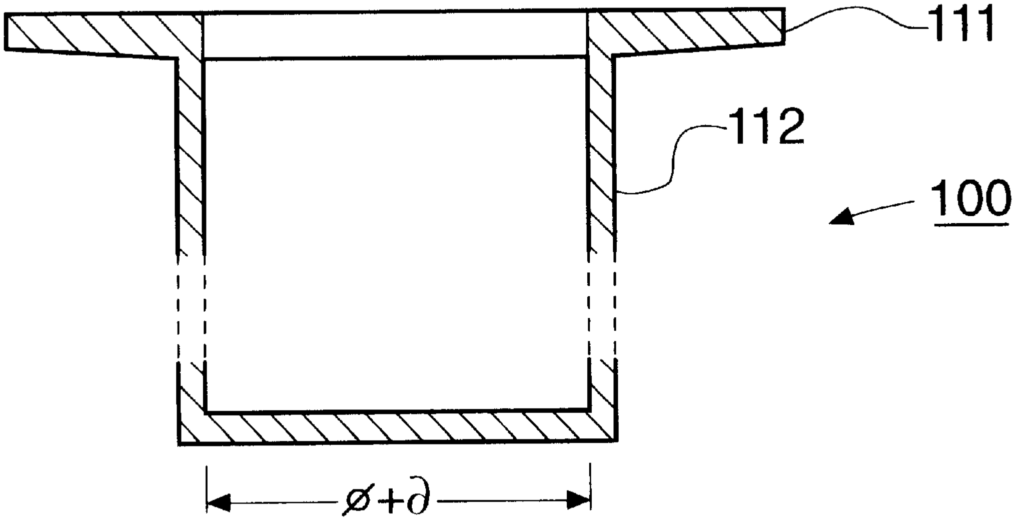
FIG. 5 is a sectional side view of a cryostat insert tube for receiving the sample holder of the first embodiment.

FIG. 5 is a sectional side view of a cryostat insert tube 100 for receiving the above-described sample holders. The insert tube 100 has a conventional construction with a flange 111 at one end for mating with the flange 11 of the vacuum flange 10 shown in FIG. 1. The insert tube 100 has a long tubular body section 112 terminating in a closed base partition. The tubular body section 112 has an inner diameter $\phi+\delta$ of 50 mm, the outer diameter $\phi$ of the cage plates which are to be fitted into the insert tube 100 being slightly smaller so as to form a loose push fit into the tube so as to locate the sample holder laterally. The insert tube also comprises a standard evacuation valve and a standard pressure relief valve neither of which are shown. These valves are mounted in an upper portion of the tubular body section 112 towards the flange 111.

What is claimed is:

1. A sample holder apparatus for a cryostat insert, comprising:

a vacuum flange having an air side and a vacuum side;

a first group of at least three rod holders arranged in said vacuum flange on said vacuum side thereof to define a polygonal grid;

a first group of at least three rods having respective first ends held by the rod holders of said first group and extending parallel to each other away from said vacuum flange and conformant to said polygonal grid to respective second ends thereof;

a first sliding plate attached to said second ends of said first group of rods;

a second slide plate releasably connected to said first slide plate;

a second group of at least three rods having respective first ends attached to said second slide plate and arranged to extend beyond, and parallel to, said first group of rods to respective second ends thereof;

a third sliding plate attached to said second ends of said second group of rods;

a fourth slide plate releasably connected to said third slide plate; and a third group of at least three rods having respective first ends attached to said fourth slide plate and arranged to extend beyond, and parallel to, said second group of rods to respective second ends thereof.

2. The sample holder apparatus of claim 1, further comprising:

at least one optical component mounting plate mounted guided on said second group of rods; and a positioning device mounted guided on said third group of rods, wherein said second slide plate, said second group of rods, said at least one optical component mounting plate, and said third slide plate form a detachable optics module, and wherein said fourth slide plate, said third group of rods, and said positioning device form a detachable positioning module.

3. The sample holder apparatus of claim 2, further comprising:

a fourth group of at least three rod holders arranged in said flange on said air side thereof;

a fourth group of at least three rods held by respective ones of said fourth group of rod holders to extend parallel to each other away from said flange conformant to said polygonal grid and parallel to said first group of rods; and a window arranged in said vacuum flange and extending across an area lying within said polygonal grid, thereby to provide optical access through said vacuum flange.

4. The sample holder apparatus of claim 3, further comprising:

a camera mounted on said fourth group of rods facing said window to view through said vacuum flange.

5. A sample holder apparatus for a cryostat insert, comprising:

a vacuum flange having an air side and a vacuum side;

a first group of at least three rod holders arranged in said vacuum flange on said vacuum side thereof to define a polygonal grid;

a first group of at least three rods having respective first ends held by the rod holders of said first group and extending parallel to each other away from said vacuum flange and conformant to said polygonal grid to respective second ends thereof;

a first slide plate attached to said second ends of said first group of rods;

a second slide plate releasably connected to said first slide plate;

a second group of at least three rods having respective first ends attached to said second slide plate and arranged to extend beyond, and parallel to, said first group of rods to respective second ends thereof;

an optical component mounting plate fitted with a convex lens mounted guided on said first group of rods;

a positioning device mountedly guided on said second group of rods; and a sample holder mounted on said positioning device approximately at a focus of said convex lens, wherein said second slide plate, said second group of rods, said positioning device, and said sample holder form a detachable positioning module.

6. A sample holder apparatus for a cryostat insert, comprising:

a vacuum flange having an air side and a vacuum side;

a first group of at least three rod holders arranged in said vacuum flange on said vacuum side thereof to define a polygonal grid;

a first group of at least three rods having respective first ends held by the rod holders of said first group and extending parallel to each other away from said vacuum flange and conformant to said polygonal grid to respective second ends thereof;

a first slide plate attached to said second ends of said first group of rods;

a second slide plate releasably connected to said first slide plate;

a second group of at least three rods having respective first ends attached to said second slide plate and arranged to extend beyond, and parallel to, said first group of rods to respective second ends thereof;

a first optical component mounting plate fitted with an optical fiber coupler and mountedly guided on said second group of rods;

an optical fiber having an end held in said fiber coupler;

a second optical component mounting plate fitted with a first convex lens mounted guided on said second group of rods and positioned to focus light onto said end of said optical fiber;

a third optical component mounting plate fitted with a second convex lens mounted guided on said second group of rods and positioned to pass light to said first convex lens;

a positioning device mountedly guided on said second group of rods; and a sample holder mounted on said positioning device approximately at a focus of said second convex lens.

* * * * *